(12) United States Patent
Lawson et al.

(10) Patent No.: US 6,530,587 B2
(45) Date of Patent: Mar. 11, 2003

(54) WHEEL SUSPENSION SYSTEM HAVING AN INTEGRATED LINK, SPRING, AND ANTI-ROLL BAR

(75) Inventors: Robert Christian Lawson, Ann Arbor, MI (US); Frederick Mark Deadrick, Beverly Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 70 days.

(21) Appl. No.: 09/870,251

(22) Filed: May 30, 2001

(65) Prior Publication Data

US 2002/0000703 A1 Jan. 3, 2002

Related U.S. Application Data

(60) Provisional application No. 60/215,422, filed on Jun. 30, 2000.

(51) Int. Cl.[7] .............................................. B60G 11/02

(52) U.S. Cl. ......................... 280/124.17; 280/124.171; 267/52

(58) Field of Search .................... 280/127.17, 124.171, 280/124.175, 124.134, 124.148, 124.153; 267/40, 52, 260, 47

(56) References Cited

U.S. PATENT DOCUMENTS

| | | | | | |
|---|---|---|---|---|---|
| 191,536 | A | * | 6/1877 | Ludlow | 280/124.171 |
| 1,898,721 | A | * | 2/1933 | Farkas | 188/321.11 |
| 2,471,135 | A | * | 5/1949 | Wyeth | 267/192 |
| 3,181,641 | A | * | 5/1965 | Haddad | 180/256 |
| 3,197,190 | A | * | 7/1965 | Miyashiro | 267/192 |
| 3,806,151 | A | * | 4/1974 | Prasniewski | 267/52 |
| 4,313,618 | A | * | 2/1982 | Robinson | 280/124.134 |
| 4,458,918 | A | * | 7/1984 | Rumpel | 267/262 |
| 4,779,894 | A | * | 10/1988 | Cowburn | 267/52 |
| 4,854,606 | A | * | 8/1989 | de Goncourt et al. | 280/124.14 |
| 6,189,904 | B1 | * | 2/2001 | Gentry et al. | 267/149 |

FOREIGN PATENT DOCUMENTS

| | | | |
|---|---|---|---|
| FR | 2586624 | A1 * | 3/1987 |
| FR | 2605940 | A1 * | 5/1988 |
| FR | 2634696 | A1 * | 2/1990 |

* cited by examiner

Primary Examiner—Paul N. Dickson
Assistant Examiner—Faye M. Fleming

(57) ABSTRACT

A rear wheel suspension system replaces the lower control arms, coil springs, and anti-roll bar assembly in the prior art with a simple composite beam. By carefully designing the shape of the beam, the material system and the pivot locations, the ride and roll rates and camber and toe characteristics of the original prior art suspension system can be preserved.

15 Claims, 4 Drawing Sheets

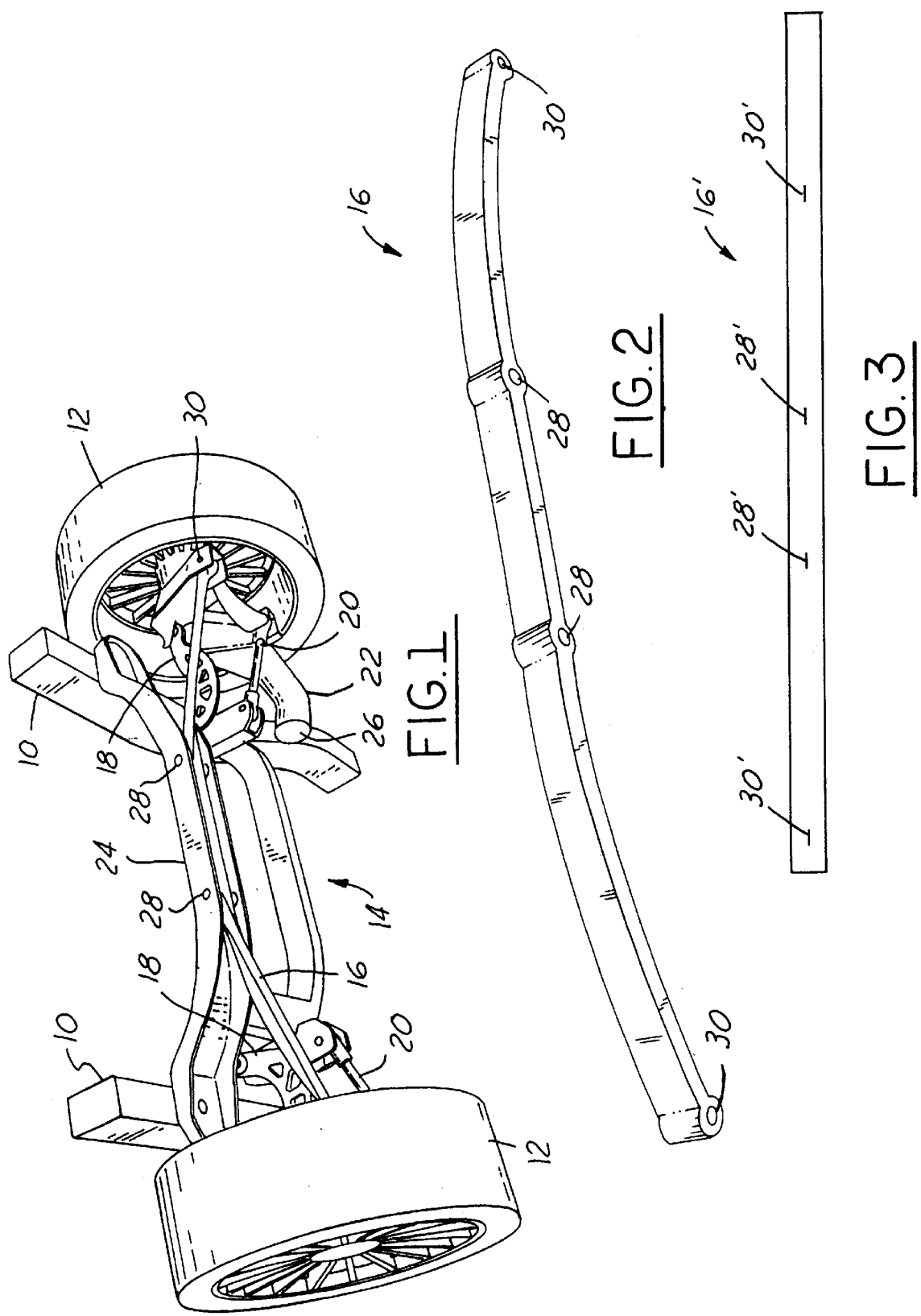

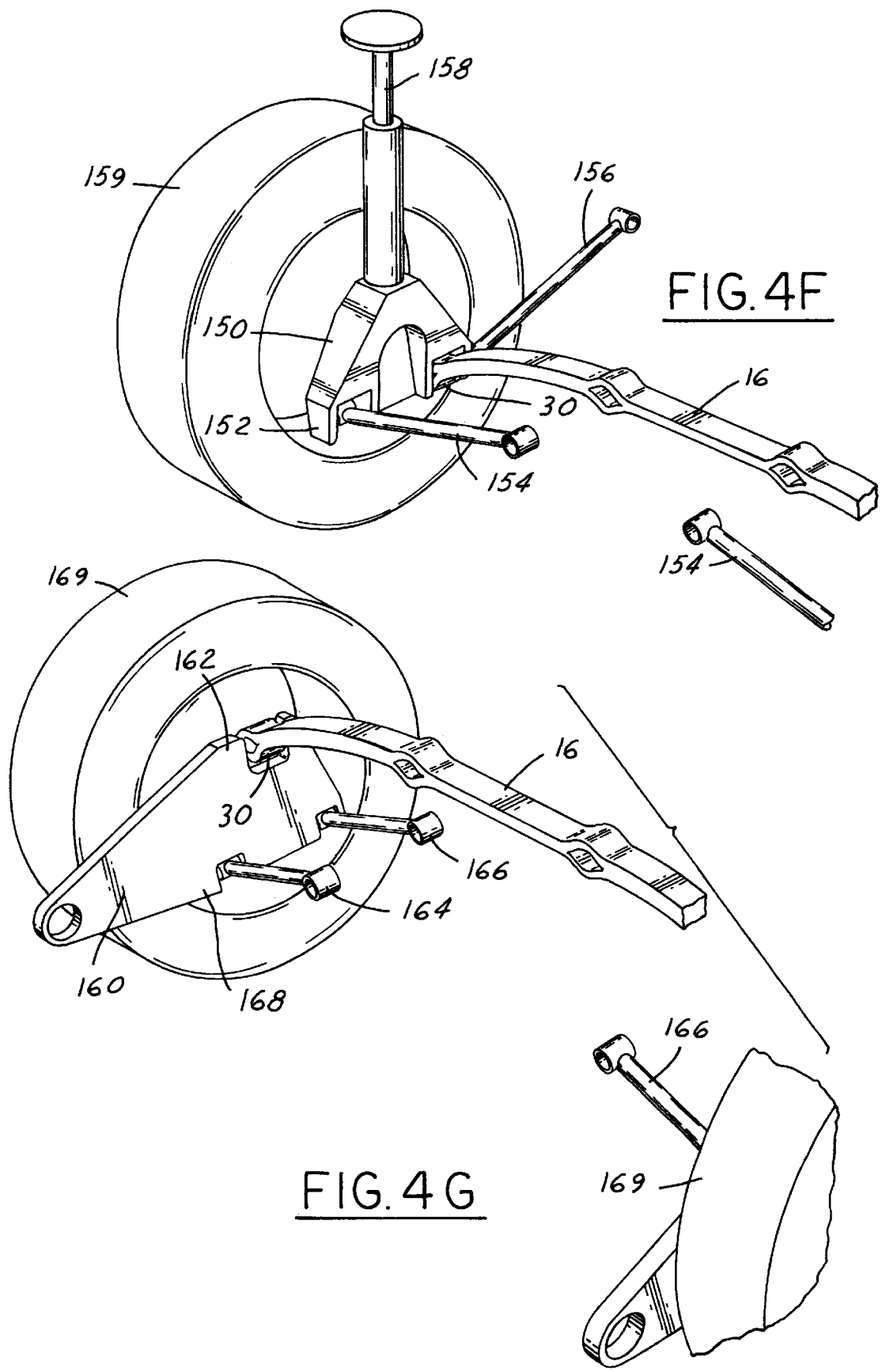

WHEEL SUSPENSION SYSTEM HAVING AN INTEGRATED LINK, SPRING, AND ANTI-ROLL BAR

CROSS REFERENCE TO RELATED APPLICATIONS

The present invention claims priority from co-pending U.S. Provisional Application Serial No. 60/215,422, filed Jun. 30, 2000 and entitled "Method of Manufacturing Cross-Car Leaf Spring and Article Produced Thereby."

TECHNICAL FIELD

The present invention relates generally to wheel suspension systems for motor vehicles, and more particularly, to a rear wheel suspension system having an integrated link, spring, and anti-roll bar.

BACKGROUND ART

A suspension system on an automobile works with the tires, frame or unit body, wheels, wheel bearings, brake system, and steering system to provide a safe and comfortable mode of transportation. A suspension system has several important functions, including supporting the various components of an automobile, allowing the tires to move up and down to provide a comfortable ride, allowing for rapid cornering without extreme body roll, keeping the tires on the road surface, preventing excessive body squat when accelerating, preventing excessive body dive when braking, allowing the front wheels to turn side-to-side for steering, and, in combination with the steering system, keeping the wheels in correct alignment.

These suspension systems use front and rear springs to suspend a vehicle's frame, body or unitized body, engine, and powertrain above the wheels. These relatively heavy assemblies constitute what is known as "sprung" weight. The "unsprung" weight, on the other hand, includes wheels and tires, brake assemblies, and other structural members not supported by the springs. Unfortunately, high "unsprung" weight may result in adverse vehicle characteristics. Reduction of "unsprung" weight, therefore, is desirable.

Many front and rear suspension systems incorporate compression type coil springs. Some front and rear coil springs are mounted between a lower control arm and spring housing or seat in the vehicle frame or body. Coil springs are made of steel or steel alloy and may have evenly or variably spaced coils to provide adequate durability and vehicle stability under all intended load conditions. Unfortunately, compression type coil springs are typically heavy and may require significant packaging space within the vehicle.

When coil springs are used in either a front or rear suspension, three or four linkages are typically placed between the wheel axles and the frame to carry driving and braking torque. These linkages support driving and braking torque, the vertical load due to road loads, and cornering (lateral) loads. The lower control arms pivot in the frame members and sometimes support the rear coil springs to provide for up and down movement of the axle and wheel assembly. Unfortunately, these linkages increase the amount of "unsprung" weight, while increasing overall part count and complexity.

In addition, an anti-roll bar is usually attached from the rear suspension lower control arm to the frame side rail to hold the rear axle housing in proper alignment with the frame and to prevent side sway (roll motion) of the body. Unfortunately, anti-roll bars are typically heavy and require significant packaging within the vehicle. In addition, anti-roll bars increase the overall part count and complexity of suspension systems.

The disadvantages associated with these conventional rear suspension techniques have made it apparent that a new technique for rear suspension is needed. The new technique should integrate multiple automotive suspension functions into one integral unit. Additionally, the new technique should reduce part count and weight while potentially improving noise vibration and harshness (NVH) and reducing complexity. The present invention is directed to these ends.

SUMMARY OF THE INVENTION

It is, therefore, an object of the invention to provide an improved and reliable rear wheel suspension system having an integrated link, spring, and anti-roll bar. Another object of the invention is to reduce part count and weight while improving NVH and reducing complexity and cost.

In accordance with the objects of this invention, a rear wheel suspension system having an integrated link, spring, and anti-roll bar is provided. In one embodiment of the invention, a rear wheel suspension system replaces the lower control arms, coil springs, and anti-roll bar assembly in the prior art with a simple composite beam. By designing the shape of the beam, the material system and the pivot locations, the ride and roll rates and camber and toe characteristics of the original prior art suspension system can be preserved.

The present invention thus achieves an improved rear wheel suspension system having an integrated link, spring, and anti-roll bar. The present invention is advantageous in that it integrates multiple automotive suspension functions into one unit.

Additional advantages and features of the present invention will become apparent from the description that follows, and may be realized by members of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 1 is an illustration of a rear wheel suspension system having an integrated link, spring, and anti-roll bar in accordance with one embodiment of the present invention;

FIG. 2 is an illustration of a composite beam in accordance with one embodiment of the present invention;

FIG. 3 is a cross section of a 3D woven preform part for a composite beam in accordance with a preferred embodiment of the present invention; and FIGS. 4A–G are illustrations of alternative preferred ways of locating the composite beam on a trailing arm within a rear wheel suspension system.

BEST MODES FOR CARRYING OUT THE INVENTION

Figure 4A:
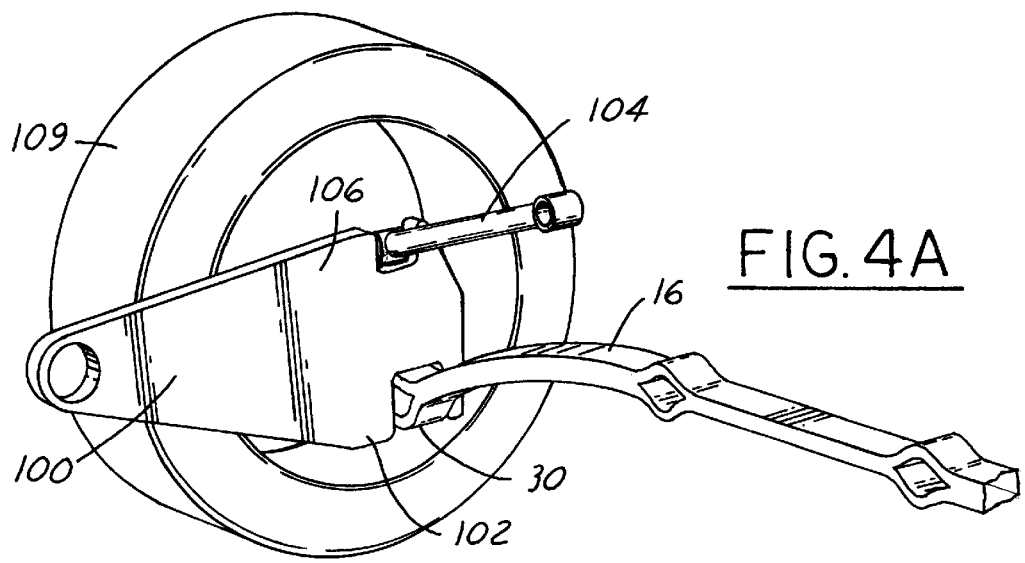

In the following figures, the same reference numerals will be used to identify identical components in the various views. The present invention is illustrated with respect to a rear wheel suspension system having an integrated link, spring, and anti-roll bar, particularly suited for the automotive field. However, the present invention is applicable to various other uses that may require rear wheel suspension systems.

Referring to FIG. 1, a rear wheel suspension system 14 having an integrated link, spring, and anti-roll bar in accordance with one embodiment of the present invention is illustrated. A motor vehicle chassis 10 (or unitized body and chassis) is supported on left and right road wheels 12 by a wheel suspension system 14. The wheel suspension system 14 includes a composite beam 16, a pair of upper control arms 18, and a pair of lower toe links 20.

The composite beam 16 replaces the lower control arms, coil springs, and anti-roll bar assembly in the prior art rear wheel suspension system. The composite beam 16 is preferably composed of a fiber-reinforced thermoset or thermoplastic polymer laminate material. Preferably, the polymer used in the composite laminate layers is an epoxy resin. The method for making the composite beam 16 is described below in FIG. 3.

Each upper control arm 18 and lower toe link 20 connects a flexible trailing arm 22, or knuckle, to the motor vehicle chassis 10 through a chassis cross-member 24. Members are provided to pivotally connect the forward end 26 of each trailing arm 22 to the chassis 10. Additional members are provided to pivotally connect the inner ends of each upper control arm 18 and lower toe link 20 to the chassis cross-member 24 and their outer ends to a respective trailing arm 22.

As best seen in FIG. 2, inner attachment members 28 are provided to pivotally connect the composite beam 16 to the chassis cross-member 24. Also, outer attachment members 30 are provided at each end of composite beam 16 to pivotally connect the chassis cross-member 24 to a respective trailing arm 22.

Referring to FIG. 3, a cross section of a 3D woven preform part 16' for a composite beam 16 in accordance with one embodiment of the present invention is illustrated. In this process, multiple spools of fiber (glass and/or carbon) feed fiber into a weaving machine that loops the fiber across the width and through the thickness, with a majority of the fibers running along the length of the composite beam preform. A curable resin, preferably an epoxy resin, is added to the weaving to bind the fibers into a preform. The initial preform would be approximately 1.5 m wide and may be manufactured using a 3D textile weaving process. Approximately 50 mm of the initial preform would be cut off for each part 16'. Sacrificial inserts would be placed into the preform slits, corresponding to an outer pivot 30' and inner pivot 28', thereby expanding them into holes that are used to form attachment members 30 and 28, respectively. This preform 16' could then be placed in a mold and consolidated with resin using a resin transfer molding (RTM) or vacuum-assisted resin transfer molding (VARTM) process to form the finished composite beam 16.

In an alternative fabrication method, the initial preform 16' could be cut very wide (500–1000 mm wide. After the wide piece is molded and cured, the preform is cut into 50 mm pieces using a saw or waterjet or similar type device. This method may be preferable in that it is easier to cut the preform 16' after curing and because it is more efficient to load one large preform into a mold as compared with multiple smaller preforms into multiple molds.

The composite beam 16 may also be made using other composite manufacturing techniques. These techniques may include the use of fiber pre-impregnated with resin, dry fibers consolidated using either the RTM or VARTM process, filament winding, textile braiding, or other composite manufacturing techniques known in the art.

The present invention allows the trailing arm 22 to locate the wheel axis fore/aft and react to braking torque, while the three lateral links (provided by composite beam 16, upper control arm 18, and lower toe link 20) provide camber and toe control. Due to the present suspension design, the wheel axis moves along an arc as viewed in the side view. The outer attachment members 30 on the composite beam 16 must also follow an arc. The composite beam 16 must flex both vertically and fore/aft. The outer attachment member 30 is free to flex in the Y direction, and in doing so it controls the toe along with the upper control arm 18. To reduce stresses and forces in the member 16 due to the fore/aft bending of the member 16 as the outer attachment member 30 follows the arc, the concept of using a composite beam 16 with a cross section whose bending axis is angled in the XZ plane may be used. This results in a composite beam 16 that travels fore/aft as well as vertically when loaded with only a vertical load at the outer attachment member 30. The composite beam 16 may be designed to have a trapezoidal cross section to lower stresses.

By carefully designing the shape of the composite beam 16, the material system and the pivot locations 28, the ride and roll rates and camber and toe characteristics of the rear wheel suspension system 14 can be changed to achieve desired characteristics. For example, by varying the bending stiffness at various points along the composite beam 16, the ride and roll characteristics of the rear wheel suspension system 14 may be altered.

While the composite beam 16 present invention is preferably coupled to the trailing arm 22 as in FIG. 1, there are many other ways of locating the composite beam 16 onto the trailing arm 22. Some of these preferred ways are depicted below in FIGS. 4A–4G.

The descriptions below in FIGS. 4A–4G refer to two different types of trailing arms; semi-rigid and flexible. In flexible trailing arms, the region of the trailing arm connecting the lateral links, composite beam 16, and the axle are fairly rigid. Meanwhile the forward portion of the trailing arm is relatively flexible, having a thin (Y direction) yet tall (Z direction) cross section. This yields a suspension system where toe and camber are controlled by the lateral links and cross car spring(s), while the forward portion of the trailing arm reacts the braking torque and provides fore/aft location. This design allows the suspension to be better tuned to both improve handling and reduce NVH.

Semi-rigid trailing arms, on the other hand, play an integral role in controlling toe in the suspension, in addition to the functions it provides as described above with regards to flexible trailing arms. Suspension topologies including a "semi-rigid" trailing arm typically require one fewer locating members (either composite beam 16 or lateral link) per side.

Referring now to FIG. 4A, the outer attachment members 30 of the composite beam 16 are each coupled to a respective lower portion 102 of a semi-rigid trailing arm 100. An upper control arm 104 is also shown coupled to an upper portion 106 of the semi-rigid trailing arm 100. Each trailing arm 100 is used for rotatably mounting a road wheel 109.

Figure 4B:
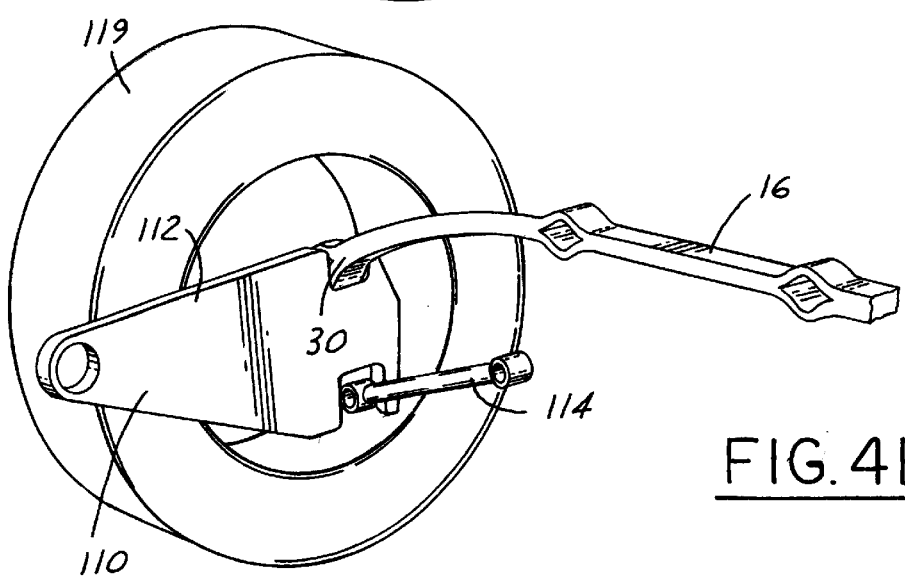

Referring now to FIG. 4B, the outer attachment members 30 of the composite beam 16 are coupled to a respective upper portion 112 of a semi-rigid trailing arm 110. A lower toe link 114 is also coupled to a lower portion 116 of the semi-rigid trailing arm 110. Each trailing arm 110 is used for rotatably mounting a road wheel 119.

Figure 4C:
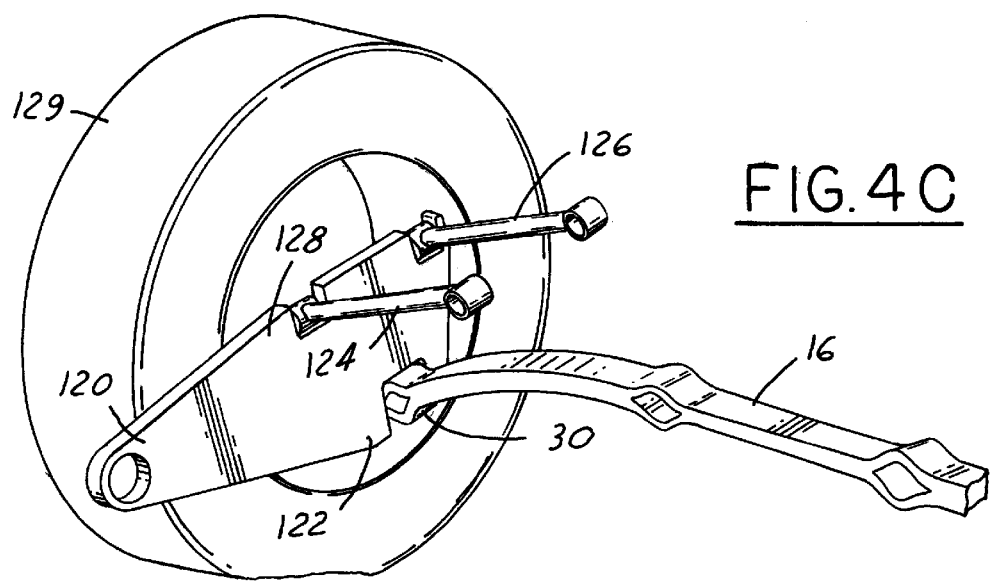

Referring now to FIG. 4C, the outer attachment members 30 of the composite beam 16 are coupled to a lower portion 122 of a flexible trailing arm 120. A pair of upper control arms 124, 126 are also shown coupled to an upper portion 128 of the semi-rigid trailing arm 120. Each trailing arm 120 is used for rotatably mounting a road wheel 129.

Figure 4D:
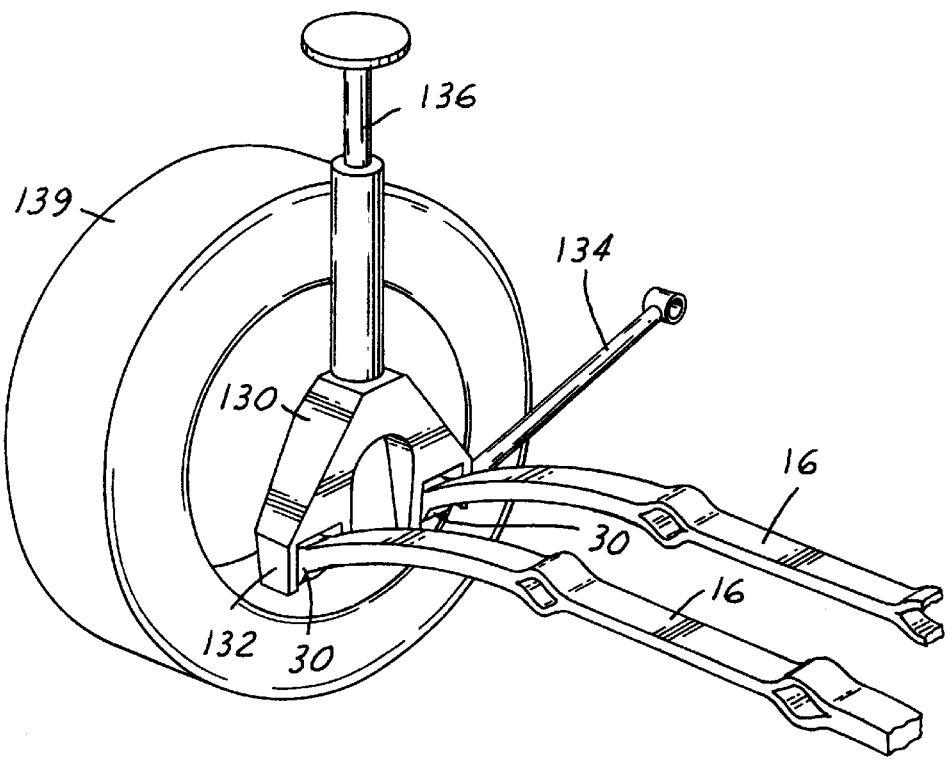

Referring now to FIG. 4D, the outer attachment members 30 of a pair of composite beams 16 are each coupled to a respective lower portion 132 of a semi-rigid trailing arm 130. Also coupled to the semi-rigid trailing arm 130 is a fore-aft link 134 and a damper and strut 136. Each trailing arm 130 is used for rotatably mounting a road wheel 139.

Figure 4E:
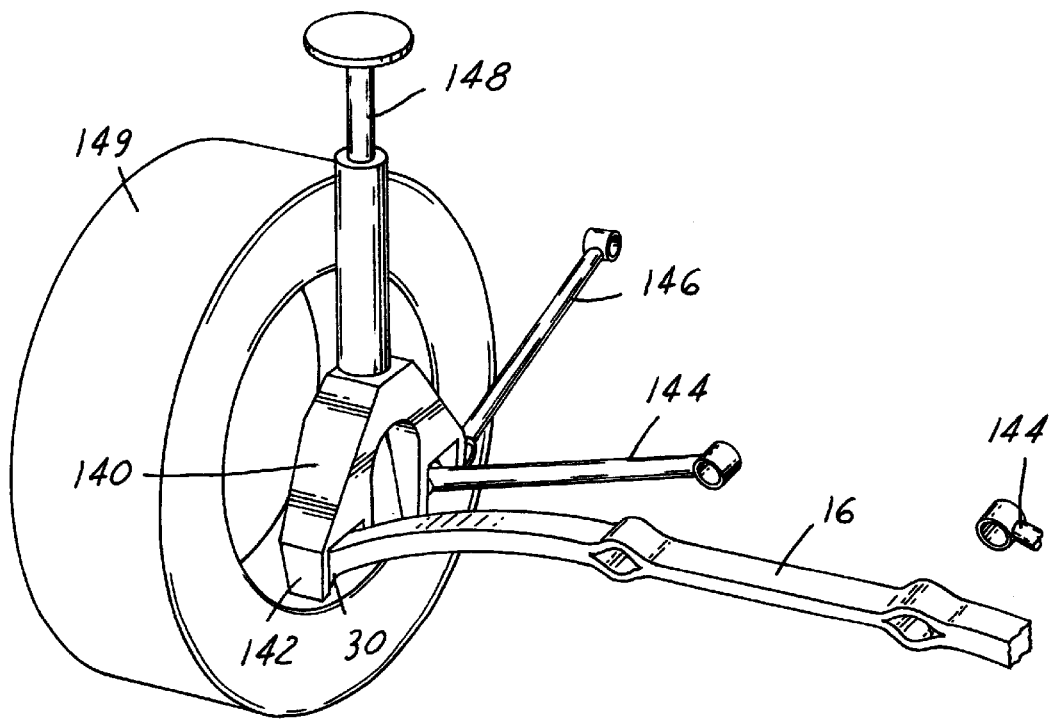

Referring now to FIG. 4E, the outer attachment members 30 of a composite beam 16 are coupled to a respective lower portion 142 of a semi-rigid trailing arm 140. A lower toe link 144 is also coupled to the lower portion 142. Also coupled to the semi-rigid trailing arm 140 is a fore-aft link 146 and a damper and strut 148. In this embodiment, the fore-aft link 146 is located is close proximity to the lower toe link 144. Each trailing arm 140 is used for rotatably mounting a road wheel 149.

Referring now to FIG. 4F, the outer attachment members 30 of a composite beam 16 are coupled to a respective lower portion 152 of a semi-rigid trailing arm 150. A lower toe link 154 is also coupled to the lower portion 152. Also coupled to the semi-rigid trailing arm 150 is a fore-aft link 156 and a damper and strut 158. In this embodiment, the fore-aft link 156 is located is close proximity to the composite beam 16. Each trailing arm 150 is used for rotatably mounting a road wheel 159.

Referring now to FIG. 4G, the outer attachment members 30 of the composite beam are attached to a respective upper portion 162 of a semi-rigid trailing arm 160. A pair of lower toe links 164, 166 are also coupled to a lower portion 168 of the semi-rigid trailing arm 160. Each trailing arm 160 is used for rotatably mounting a road wheel 169.

While not shown in FIGS. 4A–4G, each trailing arm 102, 110, 120, 160 or trailing arm knuckle 130, 140, 150 is attached to the vehicle chassis at its forward end in a manner similarly described in FIG. 1, wherein the forward end 26 of the trailing arm 22 is coupled to the vehicle chassis. Also, each fore-aft link 134, 146, 156 is attached to the vehicle body or frame. Further, each upper control arm 104, 124, 126 is mounted to a vehicle chassis cross member in a manner similar to the mounting of the upper control arm 18 in FIG. 1. Finally, each lower toe link 114, 144, 154, 166 is coupled to a chassis cross member in a manner similar to mounting the lower toe link 20 to the chassis cross-member 24 in FIG. 1.

The present invention thus achieves an improved and reliable rear wheel suspension system having an integrated link, spring, and anti-roll bar by using a composite beam 16. In this way, the present invention integrates multiple automotive suspension functions into one integral unit.

It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:
1. A rear wheel suspension for a vehicle comprising:
   a chassis;
   a pair of trailing arms for rotatably mounting a pair of road wheels;
   a chassis cross-member coupled to said chassis;
   a composite beam having outer attachment members and inner attachment members, said outer attachment members rotatably coupled to each of said pair of trailing arms and said inner attachment members rotatably coupled to said chassis cross-member; and
   a pair of upper control arms, each of said upper control arms having an inner control arm end and an outer control arm end, wherein said inner control arm ends are rotatably coupled to said chassis cross-member and wherein said outer control arm ends are each rotatably coupled to a respective one of said pair of trailing arms.

2. The rear wheel suspension for a vehicle as recited in claim 1, wherein said chassis is a unitized body.

3. The rear wheel suspension for a vehicle as recited in claim 1, wherein said chassis is a vehicle frame.

4. The rear wheel suspension for a vehicle as recited in claim 1, further comprising a pair of lower toe links, each of said lower toe links having an inner lower link arm end and an outer toe link arm end, wherein each of said inner toe link arm ends are rotatably coupled to said chassis cross-member and wherein each of said outer toe link arm ends are rotatably coupled to a respective one of said pair of trailing arms.

5. The rear wheel suspension for a vehicle as recited in claim 1, wherein said composite beam has a rectangular cross section.

6. The rear wheel suspension for a vehicle as recited in claim 1, wherein said composite beam has a cross section whose bending axis is angled in the XZ plane.

7. The rear wheel suspension for a vehicle as recited in claim 1, wherein said composite beam has a trapezoidal cross section.

8. The rear wheel suspension for a vehicle as recited in claim 1, wherein a location of said outer attachment members and inner attachment members on said composite beam are adjusted such that a bending trajectory of said composite beam approximately matches a target arc.

9. A rear wheel suspension for a vehicle comprising:
   a chassis;
   a pair of trailing arms for rotatably mounting a pair of road wheels;
   a chassis cross-member coupled to said chassis; and
   a composite beam having outer attachment members and inner attachment members, said outer attachment members rotatably coupled to each of said pair of trailing arms and said inner attachment members rotatably coupled to said chassis cross-member; and
   a pair of lower toe links, each of said lower toe links having an inner lower link arm end and an outer toe link arm end, wherein each of said inner toe link arm ends are rotatably coupled to said chassis cross-member and wherein each of said outer toe link arm ends are rotatably coupled to a respective one of said pair of trailing arms.

10. The rear wheel suspension for a vehicle as recited in claim 9, wherein said chassis is a unitized body.

11. The rear wheel suspension for a vehicle as recited in claim 9, wherein said chassis is a vehicle frame.

12. The rear wheel suspension for a vehicle as recited in claim 9, wherein said composite beam has a rectangular cross section.

13. The rear wheel suspension for a vehicle as recited in claim 9 wherein said composite beam has a cross section whose bending axis is angled in the XZ plane.

14. The rear wheel suspension for a vehicle as recited in claim 9, wherein said composite beam has a trapezoidal cross section.

15. The rear wheel suspension for a vehicle as recited in 9, wherein a location of said outer attachment members and inner attachment members on said composite beam are adjusted such that a bending trajectory of said composite beam approximately matches a target arc.

* * * * *